United States Patent Office 3,482,941
Patented Dec. 9, 1969

3,482,941
DIRECT PRODUCTION OF MONOTUNGSTEN CARBIDE FROM ORES
John A. Palm, Jonesville, N.Y., assignor to General Electric Company, a corporation of New York
No Drawing. Filed May 29, 1968, Ser. No. 732,902
Int. Cl. C22c 29/00
U.S. Cl. 23—208      7 Claims

ABSTRACT OF THE DISCLOSURE

In the method of recovering tungsten as tungsten carbide from scheelite by heating the ore with silica and carbon, the yield of undesirable ditungsten carbide is minimized by interrupting the firing operation to break up the resulting clinker-like hot mass.

---

This invention relates generally to the art of recovering metal values from ores and is more particularly concerned with a novel method of preparing monotungsten carbide from calcium tungstate while minimizing the yield of undesirable by-product ditungsten carbide.

The nature and extent of scientific and technological growth in recent years has resulted in special materials requirements. For example, the development of larger and more powerful gas turbine engines, supersonic aircraft and rockets has resulted in an increasing demand for materials capable of delivering high physical and chemical performances under extreme operating conditions. This in turn usually results in an urgent demand for new and better techniques for producing or recovering these materials from their ores in chemical and physical condition such that they can readily be put to these new uses.

One of the more important metals which has relatively recently come into extensive use under severe operating conditions is tungsten. It possesses a high melting point and is useful in elemental form, particularly as an alloy for high-temperature applications, and in the form of monotungsten carbide for cutting tools and abrasives.

In the past, the recovery of tungsten from its ores was a relatively complex and expensive process involving a number of physical and chemical separating steps. It was usually recovered either from wolframite $$[(Fe, Mn)WO_4]$$

or scheelite ($CaWO_4$) by smelting wolframite with soda or hydroxide or by decomposing scheelite with acid. Both procedures lead through a series of processing operations to a final pure metal recovery step. The carbide product is then obtained by reacting the pure metal with carbon in still another series of mixing and reacting steps.

In copending application Ser. No. 658,640, filed Aug. 7, 1967, assigned to the present assignee, there is disclosed and claimed a process for producing the carbides of certain metals, as for example, monotungsten carbide, from a mixture having silica, calcium tungstate, and carbon, as active constituents present in amounts sufficient to form tungsten carbide and dicalcium silicate slag. The mixture is heated to a temperature no lower than about 800° C. and up to about 1600° C. in an environment non-reactive therewith for a time sufficient to form carbide. As the first direct method of extracting tungsten from ore, this invention constitutes an important advance in the art. It has been found, however, that normally from about three to eight percent of the resulting tungsten carbide product is in the form of ditungsten carbide. This diminishes the value of the product for various uses such as the production of cutting tools because in respect to physical characteristics which are important in these applications, ditungsten carbide is quite inferior to monotungsten carbide.

I have discovered that the important advantages of this direct method can be obtained while at the same time the amount of ditungsten carbide phase in the tungsten carbide product is limited to less than two percent of all the tungsten carbides present. Consequently, the process of this invention concerns the direct production of monotungsten carbide in an easier, quicker and less complex way than has hitherto been known in the art. The process, broadly described, involves bringing together as active constituents silica, calcium tungstate ($CaO \cdot WO_3$) and carbon in a predetermined amount sufficient to yield monotungsten carbide, heating the resulting mixture until it has reacted substantially to produce monotungsten carbide and dicalcium silicate, i.e. generally to a temperature in the range of about 1300° C. to 1600° C., cooling the hot mass to below about 100° C., crushing the cooled mass, and heating the crushed mass up, preferably to a temperature in the range of about 1300 C. to about 1600° C., for a period of time sufficient to substantially completely carburize ditungsten carbide but less than that required for the decomposition of the monotungsten carbide by the dicalcium silicate.

Considering the process of this invention in more detail, the following equation represents the stoichiometric reaction of this process for the direct production of monotungsten carbide:

(1) 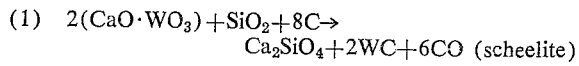
$$2(CaO \cdot WO_3) + SiO_2 + 8C \rightarrow Ca_2SiO_4 + 2WC + 6CO \text{ (scheelite)}$$

While the proportions of carbon used in Equation 1 represent stoichiometric amounts, it is preferred that some excess amount of carbon be present. Excess amounts as high as 20 percent effectively assist production of monotungsten carbide, but it has also been found that the presence of larger excesses as above 50 percent over stoichiometry tend to lead to the formation of a glassy material which is difficult to separate from the monotungsten carbide. Conversely, if insufficient carbon is present, a lower tungsten carbide such as ditungsten carbide $W_2C$ is formed which does not have the useful qualities of the monocarbide WC and, in addition, silica and scheelite tend to form a glass which complicates separation and recovery of the carbide product. The optimum amount of carbon for the production of tungsten monocarbide (WC) is indicated in the following equation:

(2) 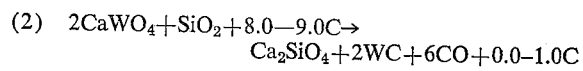
$$2CaWO_4 + SiO_2 + 8.0 - 9.0C \rightarrow Ca_2SiO_4 + 2WC + 6CO + 0.0 - 1.0C$$

Although it would appear from Equation 2 that the excess carbon performs no function, I have found that the best yields of monotungsten carbide result from its presence.

In Equation 1 the carbon can be charcoal, coal, coke or other carbon form which remains in the solid state during this process.

This reaction is carried out in an environment which is non-reactive with respect both to the materials to be reacted together and the desired products for otherwise there could be contamination and decreased yields. An argon or nitrogen atmosphere or a vacuum, for example, are suitable for carrying out this process.

After the ingredients have been combined roughly in the proportions set forth in Equations 1 and 2, the mixture is heated until the reaction set forth in Equation 1 takes place to a fairly large extent. This is accomplished satisfactorily by heating the mixture up to a temperature in the range of about 1300 to about 1600° C. Temperatures much higher than about 1600° C. are conducive to side reactions which limit the effectiveness of the reducing operation. Temperatures much lower than about 1300° C. require heating periods which are too long for most commercial applications.

Preferably, in carrying out the present process, the mixture is packed in a suitable receptacle such as a carbon crucible or crucible of other material such as clay-graphite. It is then heated by plunging it into a preheated furnace operating at or close to the desired temperature within the 1300 to 1600° C. temperature range. When the mixture reaches this desired temperature range, it is removed from the furnace and cooled in a nonreactive atmosphere to a temperature of at least about 100° C. and preferably room temperature. The cooling may be carried out by any conventional method, as for example, by placing the hot mass in a nitrogen atmosphere which is at room temperature. Such cooling is necessary to prevent oxidation of the mass during the succeeding crushing operation.

In carrying out the initial heating, best results are obtained if the hot mass is removed from the furnace, or other heat source, when it reaches the desired temperature. However, although there is no advantage in doing so, this heating may be continued at the desired temperature until an increase in ditungsten carbide content is found. This is determinable empirically by X-ray analysis. Specifically, when the mixture reaches the desired temperature, it is analyzed for ditungsten carbide, and as heating is continued, it is analyzed periodically until an increase in ditungsten carbide is found.

The cooled mass is a vesicular, friable material which is easily crushed into particle form. The crushing operation may be carried out in any conventional manner with standard equipment. For example, it may be crushed by a jaw crusher, hammer, or other impact type mill. The crushing should be sufficient to provide good contact between the unreacted carbon and the ditungsten carbide. Generally, this may be accomplished by crushing to a particle size no larger than about 16 mesh (U.S. standard screen sizes).

The crushed mass is then heated in a non-reactive atmosphere, preferably at a temperature within the 1300–1600° C. temperature range for the same reasons given above, for a period of time to complete, substantially, the carburization of ditungsten carbide but less than that required to decompose the monotungsten carbide by the dicalcium silicate. This is determinable, for example, by measuring the ditungsten carbide content periodically by X-ray analysis. Generally, such second heating may be from about 30 minutes to about 6 hours depending somewhat upon the size and geometry of charge present in the furnace where the reaction is being effected and the means of heating. This second heating is also preferably carried out by plunging the mass into a preheated furnace operating at the desired temperature.

When the second heating is completed, the product is removed from the furnace and cooled in a nonreactive atmosphere. The product has a somewhat sintered structure which may be crushed by conventional methods.

To facilitate separation of the dicalcium silicate slag from the monotungsten carbide, the product is crushed into flowable particle form. The separation is effected by standard methods. For example, the dicalcium silicate slag may be washed out with dilute hydrochloric acid. Soluble calcium chloride and a colloidal hydrated silica are formed. Provided the acid does not exceed 1 part concentrated hydrochloric to 2 parts water and the products are removed immediately, there is no danger of gelling. The resultant products may be finally washed in caustic soda and water.

Turning now to some specific examples of the process, a batch was made up by combining as active constituents 7986 grams of −200 mesh scheelite concentrate ($CaWO_4$) with 711 grams of silica (−325 mesh) and 1303 grams of carbon in the form of lampblack. The materials were mixed in a double-paddle planetary mixer, although they may be mixed in a twin-shell blender or any other suitable conventional means. To assure thorough mixing and the right degree of contact, the materials may be ball-milled together. In this instance, in the double-paddle planetary mixer, 5000 cc. of water and 100 grams of Lomar D dispersant, a condensed naphthalene sulfonate, were used to wet bond the mixture which was then milled in a ball mill for 8 hours and dried in air at 100° C. 6.1 pounds of the dried mixture were then packed into a rectangular shaped carbon container, covered and plunged into a pre-heated gas-fired muffle furnace maintained at a temperature of about 1480° C. while a gas mixture of 90% nitrogen and 10% hydrogen was flowed over its surface to protect against oxidation. Argon is as suitable in this application as nitrogen since both are non-reactive with respect to the materials being reacted. Further protection of the charge from oxidation was afforded by covering its surface with carbon felt pads, provision being made for the escape of carbon monoxide formed during the reduction step.

When the temperature of the charge reached 1470° C., which required 2 hours and 10 minutes, the charge was removed from the furnace and placed in a nitrogen atmosphere at room temperature, i.e. 25° C.

The charge was allowed to cool to room temperature. It was a crusty, vesicular, lava-like material which was easily crushed by a jaw crusher. The material was crushed in air and strained through a 16 mesh screen. A sample of the charge was analyzed by X-rays and showed about 7–8% of ditungsten carbide. This ditungsten carbide was due to insufficient carburization.

The crushed mass, weighing 4.5 pounds, was packed into the carbon crucible and returned to the hot gas-fired muffle furnace still operating at a temperature of about 1480° C. To prevent oxidation, the 90% nitrogen 10% hydrogen gas mixture was again flowed over its surface covered with carbon felt pads. The charge was raised to 1460° C. in forty minutes and held at this temperature for one hour. At the end of this time, the product was removed from the furnace and cooled to room temperature by placing it in a nitrogen atmosphere at room temperature. The product did not lose any weight. A sample was analyzed by X-rays and showed no ditungsten carbide. The X-rays also showed maximum peaks indicating the presence of monotungsten carbide in bulk quantities.

The product was returned to the hot furnace still maintained at 1480° C. and again heated in the same manner. It required 27 minutes to reach 1450° C. and was heated at this temperature for one hour. At the end of this time a sample of the product was analyzed and showed from up to 1% ditungsten carbide. This ditungsten carbide resulted from decomposition of the monotungsten carbide.

In another similar operation, the procedure of the previous example was followed with the exception that 11.2 pounds of the mixture were used. When the temperature of the charge reached 1455° C., which required 3½ hours, it was removed from the furnace and cooled to room temperature in the nitrogen atmosphere. The product weighed 8½ pounds. It was crushed to 16 mesh and a sample analyzed by X-rays showed 7% ditungsten carbide. The crushed mass was plunged into the hot furnace and required one hour to be raised to a temperature of 1455° C. and was maintained at this temperature for one hour. It was then removed from the furnace and cooled to room temperature in the nitrogen atmosphere. The product did not lose any weight. A sample was analyzed by X-rays and showed no ditungsten carbide. The X-rays also showed the presence of monotungsten carbide in bulk quantities.

What I claim as new and desire to secure by Letters Patent of the United States is:

1. A process for producing monotungsten carbide and less than two percent of ditungsten carbide from calcium tungstate comprising forming a mixture having as active constituents silica, calcium tungstate and carbon, said constituents being present in amounts sufficient to form monotungsten carbide, initially heating the mixture in an environment non-reactive therewith until it has reacted substantially to produce monotungsten carbide and dicalcium silicate, removing the resulting hot mass from the source of heat and allowing it to cool to below about 100° C. in an environment non-reactive therewith, crushing the cooled mass to contact unreacted carbon with the intermediate product ditungsten carbide, heating the crushed mass in an environment non-reactive therewith for a period of time sufficient to substantially completely carburize the ditungsten carbide but less than that required to decompose the monotungsten carbide.

2. A process according to claim 1 wherein the heating steps are carried out at a temperature in the range of about 1300° C. to about 1600 C.

3. A process according to claim 2 wherein the hot mass is cooled to room temperature.

4. A process according to claim 2 wherein the cooled mass is crushed to a maximum particle size of at least 16 mesh.

5. A process according to claim 2 wherein in the initial heating the charge is removed from the source of heat when it reaches said temperature.

6. A process according to claim 2 wherein up to about 20 percent excess carbon is used in said mixture.

7. A process according to claim 2 wherein each heating is carried out by plunging said mixture and said crushed mass into a pre-heated furnace operating close to said established temperature.

References Cited

UNITED STATES PATENTS

| | | |
|---|---|---|
| 2,364,123 | 12/1944 | Benner et al. |
| 2,529,778 | 11/1950 | McKenna. |
| 2,800,393 | 7/1957 | Mettler. |

OSCAR R. VERTIZ, Primary Examiner

G. T. OZAKI, Assistant Examiner